US012666202B2

(12) United States Patent
Backman

(10) Patent No.: US 12,666,202 B2
(45) Date of Patent: Jun. 23, 2026

(54) LOUDSPEAKER AND TERMINAL DEVICE

(71) Applicant: AAC Technologies Pte. Ltd., Singapore (SG)

(72) Inventor: Juha Backman, Tampere (FI)

(73) Assignee: AAC Technologies Pte. Ltd., Singapore (SG)

( * ) Notice: Subject to any disclaimer, the term of this patent is extended or adjusted under 35 U.S.C. 154(b) by 136 days.

(21) Appl. No.: 18/605,782

(22) Filed: Mar. 14, 2024

(65) Prior Publication Data

US 2025/0294286 A1 Sep. 18, 2025

(51) Int. Cl.
*H04R 1/30* (2006.01)
*H04R 1/02* (2006.01)

(52) U.S. Cl.
CPC ............... *H04R 1/30* (2013.01); *H04R 1/025* (2013.01); *H04R 2499/13* (2013.01); *H04R 2499/15* (2013.01)

(58) Field of Classification Search
CPC ...... H04R 1/30; H04R 1/025; H04R 2499/13; H04R 2499/15
USPC .......................................................... 381/340
See application file for complete search history.

(56) References Cited

U.S. PATENT DOCUMENTS

| | | | | |
|---|---|---|---|---|
| 10,375,469 B2 * | 8/2019 | Qin | H04R 1/025 | |
| 11,237,602 B2 * | 2/2022 | Yoon | H04R 15/00 | |
| 12,256,032 B2 * | 3/2025 | Stobbe | H04M 1/026 | |
| 2013/0094685 A1 * | 4/2013 | Seo | H04R 1/021 | 381/332 |
| 2015/0358705 A1 * | 12/2015 | Chen | H04R 1/02 | 381/386 |
| 2020/0045408 A1 * | 2/2020 | Wu | H04R 1/288 | |

* cited by examiner

*Primary Examiner* — Sean H Nguyen
(74) *Attorney, Agent, or Firm* — Wiersch Law Group

(57) ABSTRACT

Disclosed is a loudspeaker and a terminal device. The loudspeaker includes: a loudspeaker body having a containing cavity; a transducer accommodated in the containing cavity separated by the transducer into a front and a rear cavity along the first direction, wherein a sound hole is provided on the loudspeaker body, and the sound hole is in communication with the front cavity; and a throat having a throat cavity, and a first and a second mouth arranged sequentially along the second direction. The first mouth corresponds to the sound hole, the throat cavity is in communication with the front cavity via the first mouth and the sound hole, and the throat cavity is in communication with the outside via the throat and the second mouth. The present disclosure can compress the space occupied by loudspeaker, which is suitable for a terminal device with certain internal space and a limited height.

9 Claims, 6 Drawing Sheets

LOUDSPEAKER AND TERMINAL DEVICE

TECHNICAL FIELD

The present disclosure relates to the technical field of electricity-acoustics conversion, and in particular, to a loudspeaker and a terminal device.

BACKGROUND

Loudspeaker horns are well-known way of increasing efficiency of the loudspeaker, especially at intermediate and high frequencies. It may result in practical design problems by using a horn in thin devices, such as typical portable devices, including mobile phones, tablets and laptop computers, as well as panel mounting space in vehicles. A traditional structure of a horn requires considerable physical space and may encounter practical implementation challenges when the structure of horn is scaled to the typical size of most portable devices.

SUMMARY

The object of the present disclosure is to provide a loudspeaker and a terminal device to solve technical problems in the prior art.

In the first aspect, the present disclosure provides a loudspeaker, comprising: a loudspeaker body having a containing cavity; a transducer and a throat. The transducer is accommodated in the containing cavity separated by the transducer into a front cavity and a rear cavity in a first direction, the loudspeaker body has a sound hole in communication with the front cavity. The throat has a throat cavity inside, and is provided with a first mouth and a second mouth arranged in a second direction sequentially. The first direction is perpendicular to the second direction, the first mouth is provided corresponding to the sound hole, and the throat cavity is in communication with the front cavity via the first mouth and the sound hole, and in communication with an external portion of the throat via the second mouth.

As an improvement, in an embodiment of the loudspeaker as described above, in the first direction, the throat has a first wall body and a second wall body farther away from the rear cavity than the second wall body.

An extension direction of a wall surface of the first wall body is parallel to the second direction, and the second mouth is provided on the first wall body.

A wall surface of the second wall body is an arc internal cavity surface.

As an improvement, in an embodiment of the loudspeaker as described above, in the second direction, the wall surface of the second wall body includes a first arc surface and a second arc surface continuously connected to each other.

A projection of the first arc surface in the first direction falls on the first wall body, and the distance between the first arc surface and the first wall body gradually increases along the second direction.

A projection of the second arc surface in the first direction falls on the second mouth, and the distance between the second arc surface and the second mouth gradually decreases along the second direction.

As an improvement, in an embodiment of the loudspeaker as described above, the wall surface of the first wall body is flush with a top surface of the front cavity along the first direction, and the second mouth is formed on the first wall body by recessing away from the second wall body.

As an improvement, in an embodiment of the loudspeaker as described above, an inner diameter of the second mouth is gradually expanded along the first direction.

As an improvement, in an embodiment of the loudspeaker as described above, the throat cavity has a constant width same as the front cavity has along a third direction and the third direction is perpendicular to both the first direction and the second direction.

As an improvement, in an embodiment of the loudspeaker as described above, the width of the throat cavity in the third direction gradually expands along the second direction.

As an improvement, in an embodiment of the loudspeaker as described above, a height of the front cavity in the first direction remains constant along the second direction.

In the second aspect, the present disclosure provides a terminal device, including the loudspeaker as described above.

As an improvement, in an embodiment of the loudspeaker as described above, the terminal device includes a mounting part and a reflecting part.

An end of the reflecting part is close to the mounting part, a mounting surface is formed on a side of the mounting part close to the reflecting part, a reflecting surface is formed on a side of the reflecting part close to the mounting surface, and a preset angle is formed between an extension direction of the reflecting surface and an extension direction of the mounting surface.

The mounting surface is provided with a sound opening. The sound opening is arranged close to a junction of the reflecting surface and the mounting surface, the loudspeaker is provided in the mounting part, and the throat is in communication with the souWnd opening.

The terminal device is a laptop computer, the mounting part is a housing of the laptop computer, and the reflecting part is a display of the laptop computer.

The terminal device is a vehicle, the mounting part is a front gauge or a rear shelf of the vehicle, and the reflecting part is a front window or a rear window of the vehicle.

Compared with the prior art, in the present disclosure, the throat is provided inside the loudspeaker, the first mouth and the second mouth are provided on the throat, the first mouth is in communication with the sound hole of the loudspeaker body, the second mouth is in communication with the outside, and the second mouth and the first mouth are staggered in the first direction, which can compress the space occupied by the loudspeaker to some extent, and is very suitable for a terminal device with certain internal space and a limited height.

REFERENCE SIGNS

Figure 1:
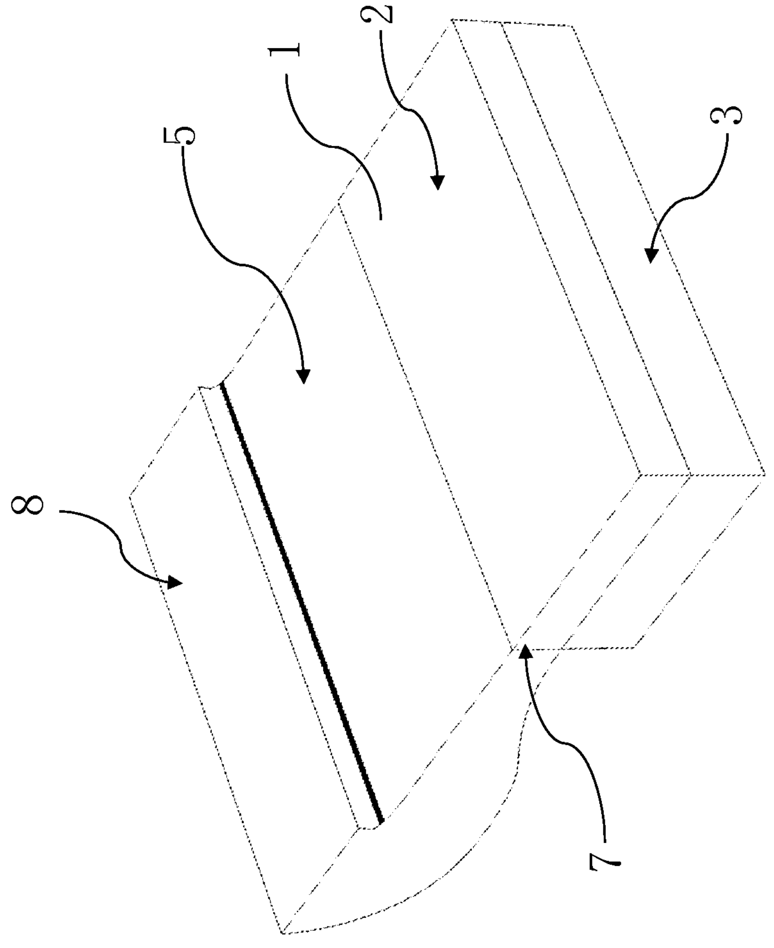
FIG. 1 is a perspective view of a loudspeaker of an embodiment of the present disclosure.

1—loudspeaker body, 2—front cavity, 3—rear cavity, 4—sound hole, 5—throat, 6—throat cavity, 7—first mouth, 8—second mouth, 9—first wall body, 10—second wall body, 11—first arc surface, 12—second arc surface, 13—transducer;

100—terminal device, 101—mounting part, 102—sound opening, 103—reflecting part, 104—mounting surface, 105—reflecting surface;

D1—first direction;

D2—second direction; and

D3—third direction.

DESCRIPTION OF EMBODIMENTS

These embodiments described below with reference to the drawings are exemplary, and are used just to explain the present disclosure, but not to limit the present disclosure.

As shown in FIGS. 1-4, an embodiment of the present disclosure provides a loudspeaker including a loudspeaker body 1, a transducer 13 and a throat 5.

A containing cavity is provided in the loudspeaker body 1.

The transducer 13 is accommodated in the containing cavity. The loudspeaker body is configured to sound by vibration. The containing cavity is separated by the transducer 13 into a front cavity 2 and a rear cavity 3 along the first direction D1. The loudspeaker body 1 is provided with a sound hole 4 in communication with the front cavity 2. In an embodiment, the transducer 13 may include structures such as diaphragm, sound coil and magnetic circuit unit. Under the action of magnetic circuit unit, the coil with a varying current is vibrate by different sizes of Ampere force, such that the vibration of the sound coil drives the vibration of the diaphragm, and the vibration of the diaphragm drives the vibration of the surrounding air, thereby generating sound.

The throat 5 includes a throat cavity 6 inside, and is provided with a first mouth 7 and a second mouth 8. The first mouth 7 and the second mouth 8 are arranged along the second direction D2 sequentially. In an embodiment, the vibration direction of the transducer 13 is defined as the first direction D1. The normal direction of the vibration direction of the transducer 13 has a plane. The second direction D2 and the third direction D3 are in the plane. The first direction D1, the second direction D2 and the third direction D3 perpendicular to each other.

The first mouth 7 is provided corresponding to the sound hole 4. The positive projection of the sound hole 4 in the second direction D2 falls completely within the first mouth 7. The first mouth 7 completely covers the sound hole 4. The throat cavity 6 is in communication with the front cavity 2 via the first mouth 7 and the sound hole 4, and is also in communication with the outside via the throat 5 and the second mouth 8. The sectional shape of the first mouth 7 and the second mouth 8 may be a rectangular structure, or a shape with a curved surface edge, which is not limited here. The sound generated from the air activated by the diaphragm of the transducer 13 enters the front cavity 2, and then radiate through the sound hole 4, the first mouth 7, the throat 5 and the second mouth 8 in sequence.

In this embodiment, the throat 5 is arranged inside the loudspeaker, and is provided with the first mouth 7 and the second mouth 8. The first mouth 7 is in communication with the sound hole of the loudspeaker body 1, the second mouth 8 is in communication with the outside. The second mouth 8 and the first mouth 7 are staggered in the first direction D1, which can compress the space occupied by loudspeaker to some extent, and is very suitable for the terminal device 100 with a certain internal space and a limited height.

As an improvement, as shown in FIG. 1, the throat 5 has a first wall body 9 and a second wall body 10 in the first direction D1, respectively. The first wall body 9 is farther away from the rear cavity 3 than the second wall body 10. The extension direction of the wall surface of the first wall body 9 is parallel to the second direction D2. The second mouth is provided on the first wall body 9. The wall surface of the second wall body 10 is a curved internal cavity surface, which, on the one hand, can guide the air circulation, so as to improve the air fluency when the sound waves are transmitted, and can reduce flow noise and distortion, and on the other hand, can increase or reduce the height of the throat cavity 6 more smoothly.

In an embodiment, the wall surface of the second wall body 10 includes a first arc surface 11 and a second arc surface 12 continuously connected to each other in the second direction D2.

The projection of the first arc surface 11 in the first direction D1 falls on first wall body 9, and the distance between the first arc surface 11 and the first wall body 9 gradually increases in the second direction. The design that the first arc surface 11 gradually expands causes the sound to be fully in contact with the inner wall of the throat cavity 6 to boost the sound amplification effect and control the longitudinal resonance.

The projection of the second arc surface 12 falls on the second mouth 8 in the first direction D1, and the distance between the second arc surface 12 and the second mouth 8 gradually reduced in the second direction. The design that the second arc surface 12 gradually contracts can reduce the volume of the throat 5, broaden the air flow channel, increase the fluency of the air flow, and facilitate the discharge of the air flow, thereby effectively improving the acoustic performance and reliability of the loudspeaker.

In an embodiment, as shown in FIG. 1, the wall surface of the first wall body 9 is flush with the top surface of the front cavity 2 in the first direction D1. The second mouth 8 is formed on the first wall body 9 by recessing away from the second wall body 10. The second mouth 8 has a certain thickness on the first direction D1, which facilitates the installation of the throat 5, such that the second mouth 8 corresponds to the sound opening 102 of the terminal device 100.

Figure 3:
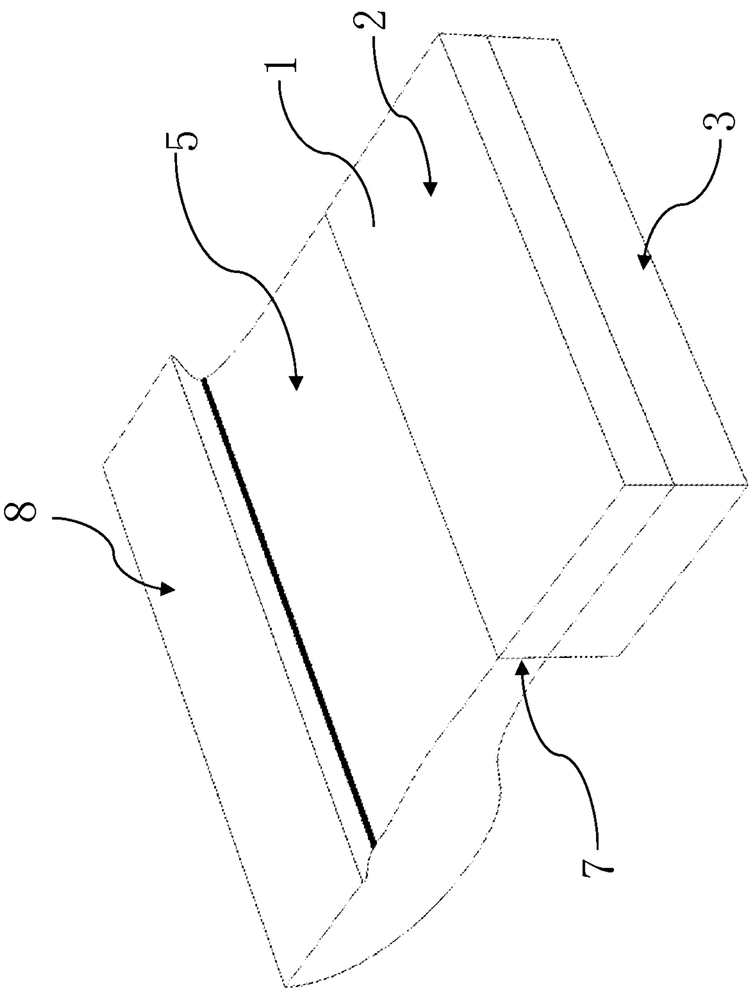
FIG. 3 is a perspective view of a loudspeaker of another embodiment of the present disclosure.

In an embodiment, as shown in FIG. 3, in the first direction, the inner diameter of the second mouth 8 is gradually expanded, the end with a larger inner diameter is farther away from the first wall body 9 than the end with a smaller inner diameter, the axis direction of the second mouth 8 is parallel to the vibration direction of the transducer 13, so that the sound is fully in contact with the inner wall of the second mouth 8 to boost the sound amplification effect and control the longitudinal resonance.

Figure 2:
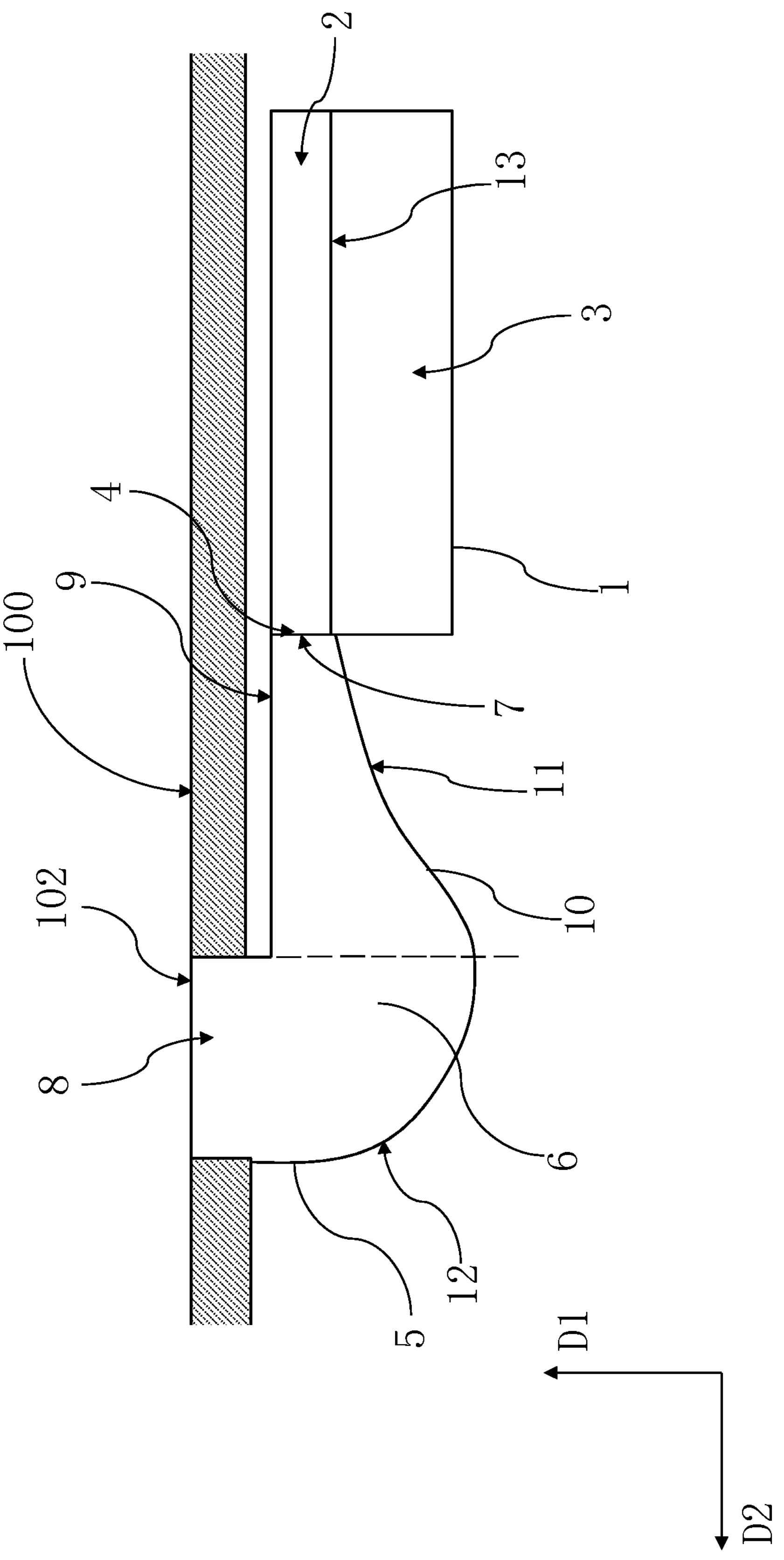
FIG. 2 is a sectional view of a loudspeaker of an embodiment of the present disclosure.

In an embodiment, as shown in FIG. 2, the sound hole 4 is arranged at an end of the front cavity 2 in the second direction D2. The sound hole 4 is located at the lateral end of the loudspeaker body 1. The axis direction of the sound hole 4 is perpendicular to the vibration direction of the transducer 13. The first mouth 7 is arranged at an end of the first wall body 9 in the second direction D2. The first mouth 7 is located at the lateral end of the throat 5. The first mouth 7 and the sound hole 4 are both arranged on the lateral portion, which can reduce the height space occupied by the loudspeaker, and make the loudspeaker more adaptable.

In an embodiment, as shown in FIG. 1, along the second direction D2, the width of the throat cavity 6 in the third direction D3 remains constant, and the width of throat cavity 6 also coincides with the width of the front cavity 2.

Figure 4:
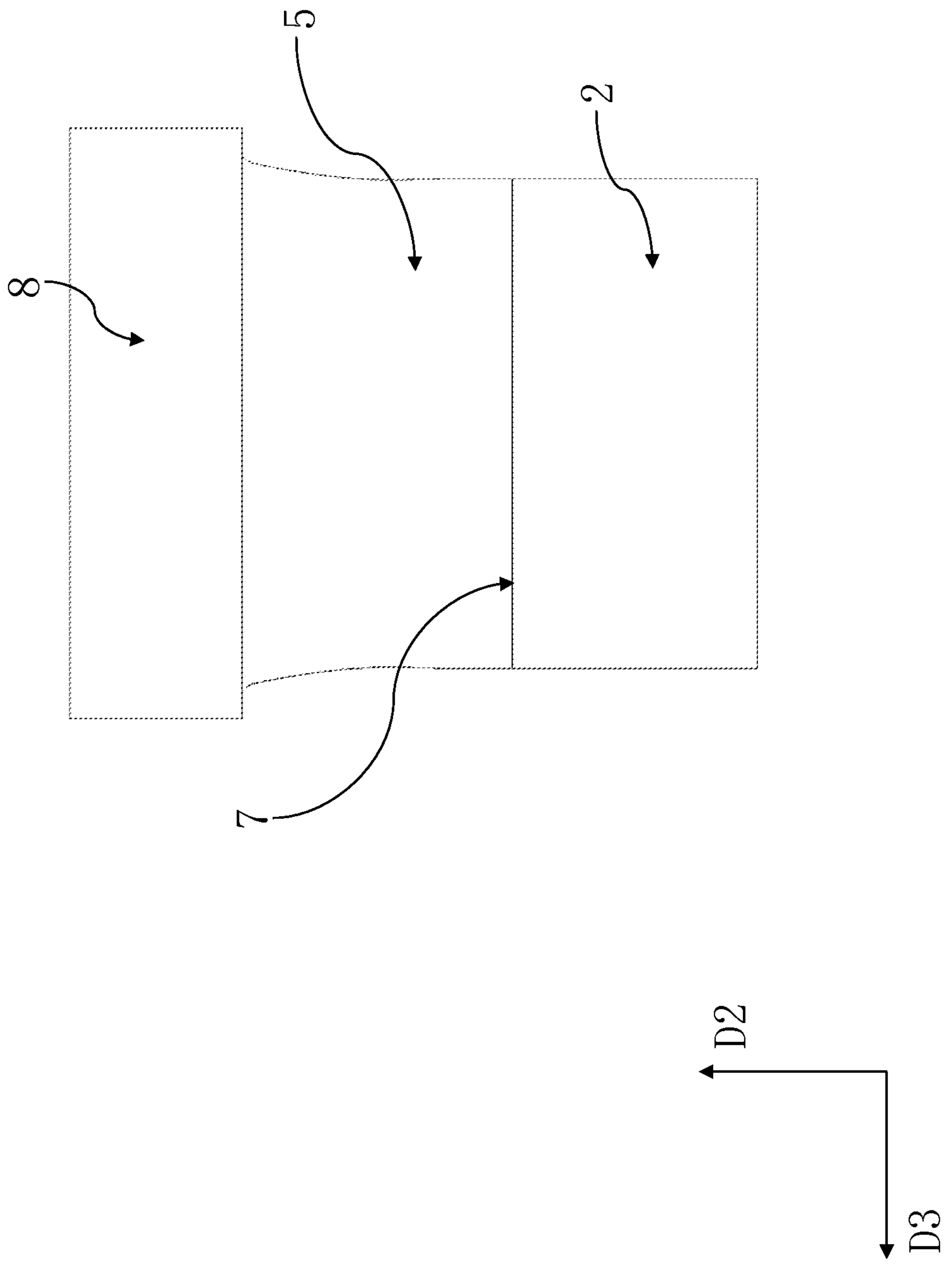
FIG. 4 is a structural schematic view of a throat of another embodiment of the present disclosure.

In another embodiment, as shown in FIGS. 3 and 4, along the second direction D2, the width of the throat cavity 6 in the third direction D3 gradually expands, the width of the throat cavity 6 at the second mouth 8 is greater than the width of the throat cavity 6 at the first mouth 7. The inner wall surface of the throat cavity 6 gradually expands near the second mouth 8, so that the sound is fully in contact with the inner wall of the throat cavity 6 to boost the sound amplification effect and control the longitudinal resonance.

In an embodiment of the present disclosure, along the second direction D2, the height of the front cavity 2 in the first direction D1 remains constant to reduce the frequency response change caused by the diaphragm motion of the transducer 13.

Figure 5:
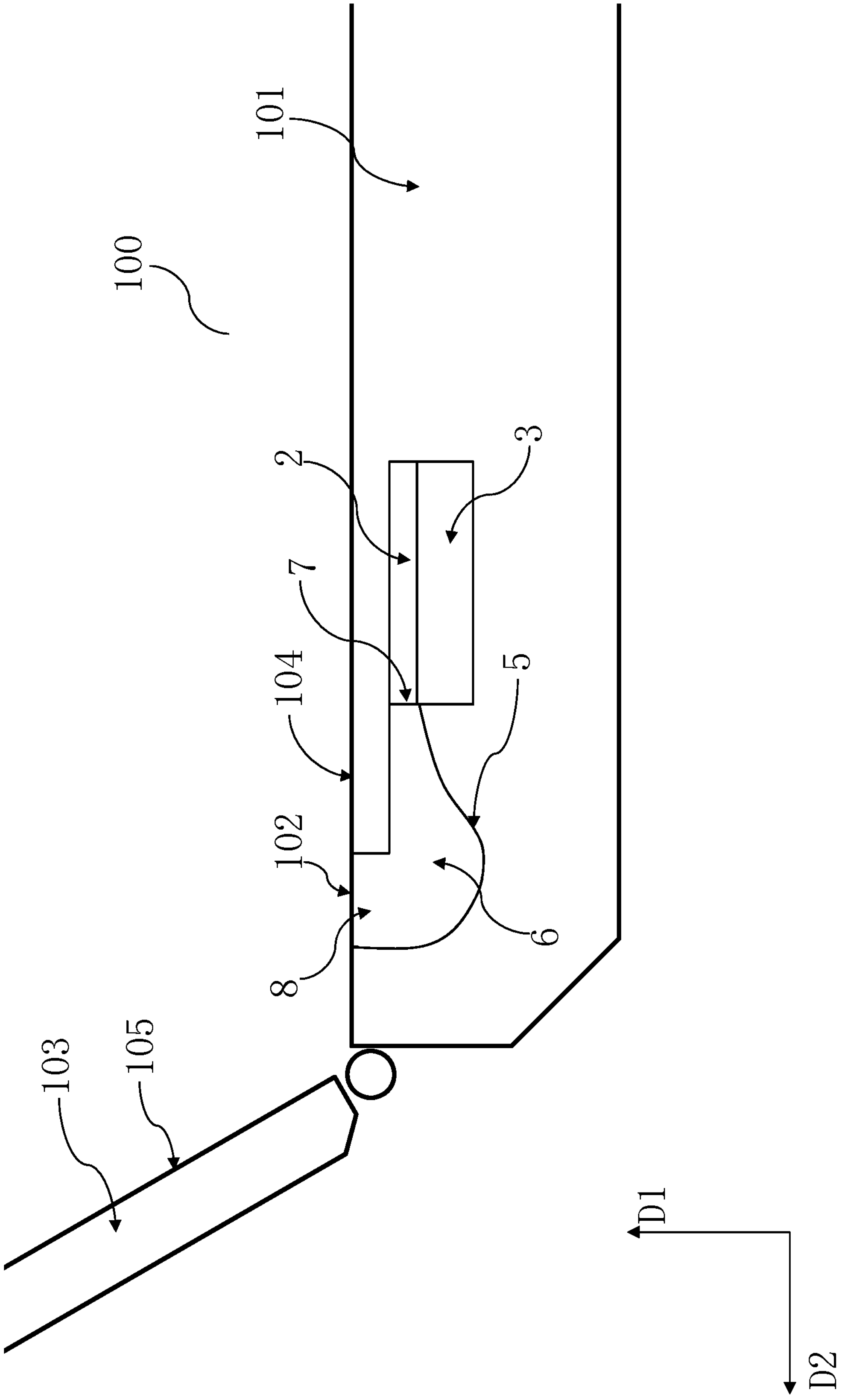
FIG. 5 is a structural schematic diagram of a loudspeaker applied to a terminal device according to an embodiment of the present disclosure.

Based on the above embodiments, as shown in FIG. 5, the present disclosure also provides a terminal device 100. The terminal device 100 includes, but is not limited to, a mobile or fixed terminal device with a loudspeaker, such as a mobile phone, a tablet, a laptop computer, a wearable device, a virtual reality device, a Bluetooth earphone or an on-board device.

The terminal device 100 includes a mounting part 101 and a loudspeaker installed in the mounting part 101 as described above. The mounting part 101 is provided with a sound opening 102. The second mouth 8 of the throat 5 of the loudspeaker is arranged corresponding to the sound opening 102. The position, shape, and size of the sound opening 102 match the second mouth 8. The sound opening 102 is opposite and connected to the second mouth 8, such that the sound generated by the transducer 13 in the loudspeaker can be transmitted from the front cavity 2, the sound hole 4, the first mouth 7, the throat cavity 6, the second mouth 8, and the sound opening 102 sequentially, to the outside of the terminal device 100.

In an embodiment, referring to FIG. 5, which shows the loudspeaker applied to a laptop computer to provide additional horn-type boost. The terminal device includes a mounting part 101 (such as a housing) and a reflecting part 103 (such as a display). An end of the reflecting part 103 is connected to the mounting part 101, preferably in a manner of hinge. A mounting surface 104 is formed on a side of the mounting part 101 near the reflecting part 103. A reflecting surface 105 is formed on a side of the reflecting part 103 near the mounting surface 104. A preset angle is formed between the extension direction of the reflecting surface 105 and the extension direction of the mounting surface 104.

The sound opening 102 is provided on the mounting surface 104, close to the junction of the reflecting surface 105 and the mounting surface 104. The sound opening 102 of the laptop computer is close to the hinge, located at a corner. The loudspeaker is arranged in the mounting part 101, and the throat 5 is in communication with the sound opening 102. The throat 5 is arranged in the sound opening 102 close the junction of the reflecting surface 105 and the mounting surface 104 (such as a display and a body of a laptop computer and a window of a car), which can provide additional horn-type boost for these surfaces, and minimize high frequency coloration.

Figure 6:
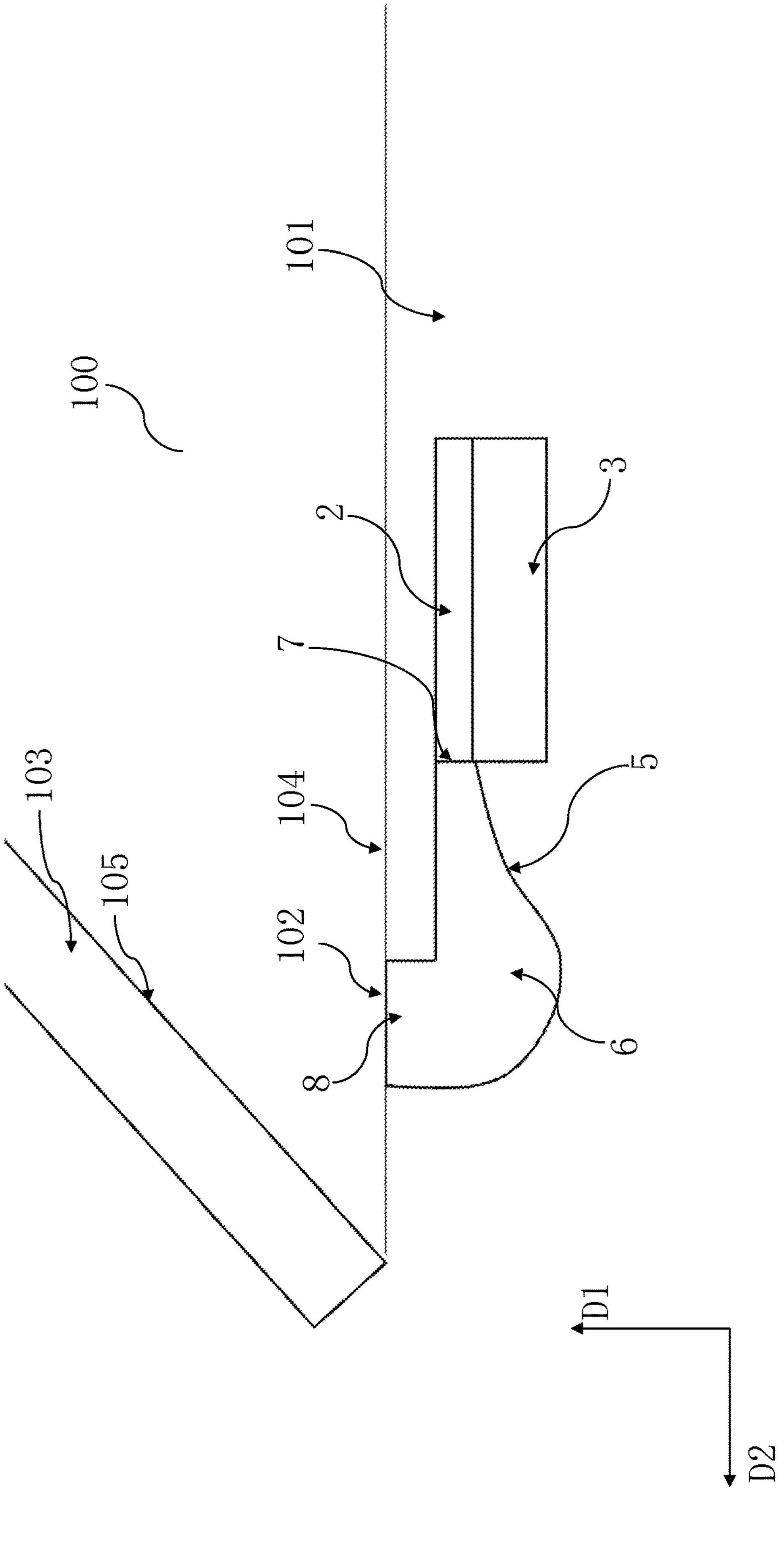
FIG. 6 is a structural schematic diagram of a loudspeaker applied to a vehicle to provide additional horn-type boost according to an embodiment of the present disclosure.

In another improvement, referring to FIG. 6, which shows the loudspeaker applied to a vehicle to provide additional horn-type boost. The terminal device includes a mounting part 101 (such as a front gauge or a rear shelf) and a reflecting part 103 (such as a front window or a rear window). An end of the reflecting part 103 is close to the mounting part 101. A mounting surface 104 is formed at a side of the mounting part 101 close to the reflecting part 103. A reflecting surface 105 is formed at a side of the reflecting part 103 close to the mounting surface 104. A preset angle between an extension direction of the reflecting surface 105 and an extension direction of the mounting surface 104.

The mounting surface 104 is provided with a sound opening 102. The sound opening 102 is arranged close to a junction of the reflecting surface 105 and the mounting surface 104. The sound opening 102 of the loudspeaker of the vehicle is provided close to the angle. The loudspeaker is provided in the mounting part 101. The throat 5 is in communication with the sound opening 102, and is arranged close to a junction of the reflecting surface 105 and the mounting surface 104, which can provide additional horn-type boost for these surfaces, and minimize high frequency coloration.

Similar design principles, as well as an appropriate zoom scale, may also be applied to other fields, such as tablets and TV loudspeakers.

The construction, characteristics and effects of the present disclosure are explained in detail according to the embodiments shown in the drawings. The above mentioned contents are just preferable embodiments of the present disclosure. However, the present disclosure does not define the scope of implementation as shown in the drawings. Any change made under the ideas of the present disclosure, or any modified equivalent embodiment of the equivalent change without departing from the spirit of the specification and drawings shall fall within the protection scope of the present disclosure.

What is claimed is:

1. A loudspeaker, comprising:

a loudspeaker body having a containing cavity inside the loudspeaker body;

a transducer accommodated in the containing cavity, wherein the containing cavity is separated by the transducer into a front cavity and a rear cavity along a first direction, and the loudspeaker body is provided with a sound hole in communicating with the front cavity; and a throat having a throat cavity inside the throat, and provided with a first mouth and a second mouth sequentially arranged in a second direction, wherein the second direction is perpendicular to the first direction, the first mouth is arranged corresponding to the sound hole, and the throat cavity is in communication with the front cavity via the first mouth and the sound hole, and in communication with an external portion of the throat via the second mouth, wherein in the first direction, the throat includes a first wall body and a second wall body, and the first wall body is farther away from the rear cavity than the second wall body;

wherein an extension direction of a wall surface of the first wall body is parallel to the second direction, and the second mouth is provided on the first wall body; and wherein a wall surface of the second wall body is an arc internal cavity surface, wherein in the second direction, the wall surface of the second wall body includes a first arc surface and a second arc surface continuously connected to each other;

wherein a projection of the first arc surface in the first direction falls on the first wall body, and a distance between the first arc surface and the first wall body gradually increases along the second direction; and wherein a projection of the second arc surface in the first direction falls on the second mouth, and a distance between the second arc surface and the second mouth gradually decreases along the second direction.

2. The loudspeaker as described in claim 1, wherein the wall surface of the first wall body is flush with a top surface of the front cavity along the first direction, and the second mouth is formed on the first wall body by recessing away from the second wall body.

3. The loudspeaker as described in claim 2, wherein an inner diameter of the second mouth is gradually expanded along the first direction.

4. The loudspeaker as described in claim 1, wherein a width of the throat cavity is same as a width of the front cavity along a third direction and remains constant, and wherein the third direction is perpendicular to both the first direction and the second direction.

5. The loudspeaker as described in claim 1, wherein a width of the throat cavity in a third direction gradually expands along the second direction.

6. The loudspeaker as described in claim 1, wherein a height of the front cavity in the first direction remains constant along the second direction.

7. A terminal device comprising a loudspeaker, a mounting part and a reflecting part, wherein the loudspeaker comprises:

a loudspeaker body having a containing cavity inside the loudspeaker body;

a transducer accommodated in the containing cavity, wherein the containing cavity is separated by the transducer into a front cavity and a rear cavity along a first direction, and the loudspeaker body is provided with a sound hole in communicating with the front cavity; and a throat having a throat cavity inside the throat, and provided with a first mouth and a second mouth sequentially arranged in a second direction, wherein the second direction is perpendicular to the first direction, the first mouth is arranged corresponding to the sound hole, and the throat cavity is in communication with the front cavity via the first mouth and the sound hole, and in communication with an external portion of the throat via the second mouth, wherein an end of the reflecting part is connected to the mounting part, a mounting surface is formed on a side of the mounting part close to the reflecting part, a reflecting surface is formed on a side of the reflecting part close to the mounting surface, and a preset angle is formed between an extension direction of the reflecting surface and an extension direction of the mounting surface; and wherein the mounting surface is provided with a sound opening, the sound opening is arranged close to a junction of the reflecting surface and the mounting surface, the loudspeaker is provided in the mounting part, and the throat is in communication with the sound opening.

8. The terminal device as described in claim 7, wherein the terminal device is a laptop computer, the mounting part is a housing of the laptop computer, and the reflecting part is a display of the laptop computer.

9. The terminal device as described in claim 7, wherein the terminal device is a vehicle, the mounting part is a front gauge or a rear shelf of the vehicle, and the reflecting part is a front window or a rear window of the vehicle.

* * * * *